Jan. 16, 1968   S. G. JOHANSSON   3,363,701
ICE-BORING TOOLS
Filed May 17, 1966

INVENTOR
SVEN G. JOHANSSON

BY Wenderoth, Lind & Ponack
ATTORNEYS

United States Patent Office 3,363,701
Patented Jan. 16, 1968

3,363,701
ICE-BORING TOOLS
Sven Georg Johansson, Stennaset, Falun, Sweden
Filed May 17, 1966, Ser. No. 550,660
5 Claims. (Cl. 175—18)

This invention relates to improvements in or relating to manually or power operated ice-boring tools comprising an elongated shaft carrying at its lowermost end a scoop-shaped boring bit adapted to move in operation along a circular path with the back thereof sliding along the wall of the bore and at its other end being adapted for connection to a drive means such as a crank brace or a gear box of a prime mover.

The object of the present invention is to provide an improved tool of the aforesaid class which in a feasible manner ensures that ice and snow mud is thrown up and out of the bore, so that the bore becomes immediately available for posting the fishing tools. Due to the fact that the bore becomes well cleared it is also ensured that the bore runs easily for which reason the risk is minimized that the bore bit sticks and gives rise to injuries when power driven.

For the just mentioned purpose the improved tool according to the present invention is essentially characterized in that the bore shaft comprises a helical rod, preferably made of a tube, said rod describing at least one full revolution and having an outer diameter slightly less than the diameter of the bore as determined by the shape of the bore bit.

It has been found particularly advantageous to design the shaft in such a manner that the pitch angle is always about 50°, independent of the outer diameter of the screw.

Furthermore, it has been found advantageous to design the mounting means of the shaft onto the scoop-shaped bore bit as a wing which is inclined with respect to the axis of the scoop and which serves to cut the ice-ball which tends to form in the bore bit.

A shoulder on the bore shaft for connection to the gear box, as well as the axis of symmetry of the bore bit, should preferably coincide with the axis of the screw or form only a small angle therewith.

In practise, it has been found advantageous to place on said shoulder a bushing which is connected to the bore shaft as by welding at the outer ends of the shaft and the bushing, and which at the lowermost end thereof has a ring-flange with an axial, semi-circular slot for receiving an axial overload pin, the boreshaft furthermore preferably having in the space inside said bushing a closeable opening for receiving reserve pins, if desired for different load ranges.

The invention will be disclosed in more details hereinafter with reference to the accompanying drawing which schematically illustrates two different embodiments thereof.

Figure 1:
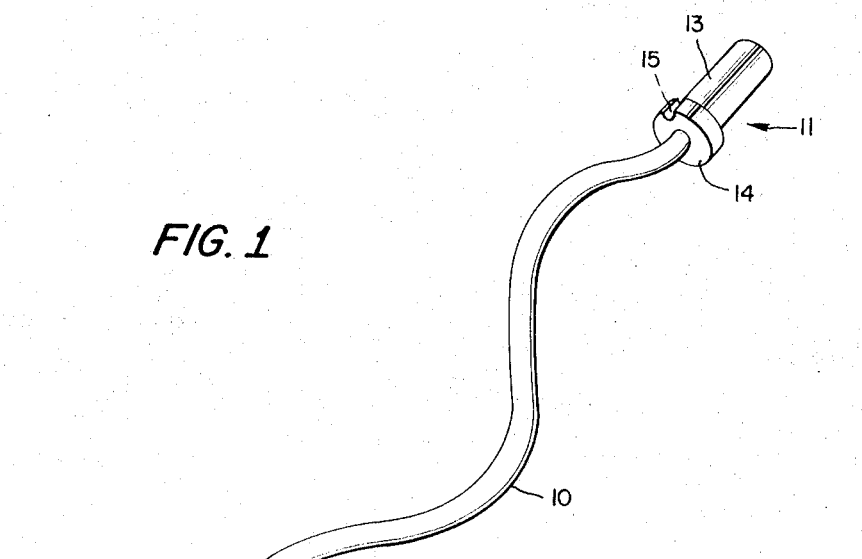

In the drawing, FIGURE 1 shows a helical bore shaft 10 having at the uppermost end thereof a shoulder for connection to a prime mover through the intermediary of a gear-box. At its lowermost end the bore shaft 10 carries a scoop-shaped ice-bore bit 12 of known type.

The helical portion of the bore shaft 10, which preferably is made of a tube of 20 mm. diameter, for example, describes at least one full revolution, and the outer diameter of the screw is slightly less than the diameter of the bore to be made which last mentioned diameter in turn is determined by the shape of the bore bit 12. Preferably, the pitch angle of the shaft is always about 50°.

The axis of symmetry of the shoulder 11, as well as that of the bore bit 12, coincide with the axis of the screw or form only a very small angle therewith.

On the shoulder 11 there is positioned a bushing 13 which is welded to the outer end of the tube shaped bore shaft and which has, at the innermost end thereof, a ring-flange 14 with an axial, semi-circular slot for receiving an over-load pin (not shown). Reserve pins, if desired for different load ranges, may be housed in the space inside the bore shaft end, inside the bushing 13.

Figure 2:
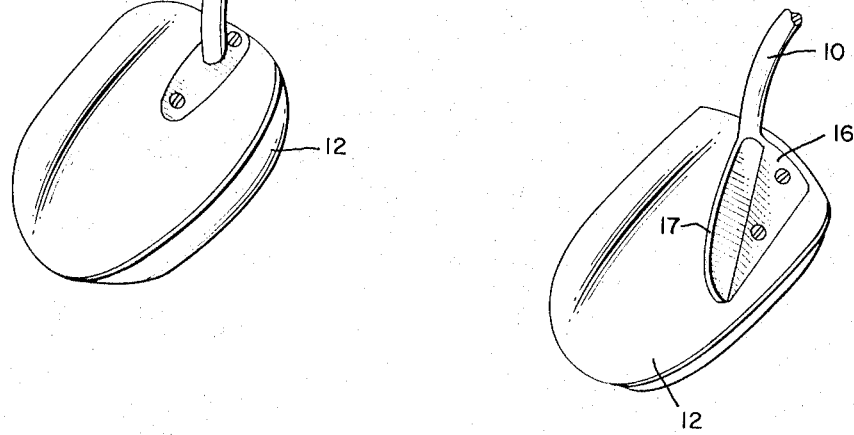

In FIGURE 2 there is shown that the mounting means 16 for the shaft 10 to the bore bit may be designed with a wing 17, inclined with respect to the axis of the bore bit and intended to cut up the ice-ball which otherwise tends to form within the scoop-shaped bore bit.

What I claim is:

1. In an ice-boring tool comprising an elongated shaft carrying at the lowermost end thereof a scoop-shaped boring bit, adapted to move in operation along a circular path with the back thereof sliding along the wall of the bore, said bore shaft comprising a helical rod, preferably made of a tube, said rod describing at least one full revolution and having an outer diameter slightly less than the diameter of the bore as determined by the shape of the bore bit.

2. A tool as claimed in claim 1, wherein the pitch angle of said bore shaft is about 50°.

3. A tool as claimed in claim 1, wherein the mounting means of the shaft onto the scoop-shaped bore bit is formed with a wing which is inclined with respect to the axis of the scoop and which serves to cut the ice-ball which tends to form in the bore bit.

4. In an ice-bore tool comprising an elongated shaft carrying at the lowermost end thereof a scoop-shaped boring bit, adapted to move in operation along a circular path with the back thereof sliding along the wall of the bore, said bore shaft comprising a helical rod, preferably made of a tube, said rod describing at least one full revolution and having an outer diameter slightly less than the diameter of the bore as determined by the shape of the bore bit, the pitch angle of said bore shaft being about 50°, and the mounting means of the shaft onto the scoop-shaped bore bit being formed with a wing which is inclined with respect to the axis of the scoop and which serves to cut the ice-ball which tends to form in the bore bit, said shaft further having at the uppermost end thereof a shoulder the axis of which like the axis of symmetry of the bore bit coincides with the axis of the screw or form a very small angle therewith.

5. A tool as claimed in claim 4, wherein there is placed on said shoulder a bushing which is connected to the bore shaft as by welding at the outer ends of the shaft and the bushing, and which at the lowermost end thereof has a ring-flange with an axial, semi-circular slot for receiving an axial overload pin, the boreshaft furthermore preferably having in the space inside said bushing a closeable opening for receiving reserve pins, if desired for different load ranges.

References Cited

UNITED STATES PATENTS

| | | | |
|---|---|---|---|
| 136,555 | 3/1873 | Smith | 175—394 |
| 2,057,365 | 10/1936 | Carlson | 175—18 |
| 2,666,623 | 1/1954 | Johnson | 175—18 |
| 2,694,552 | 11/1954 | Vadnais | 175—18 |
| 3,175,627 | 3/1965 | Larsson | 175—18 |

FOREIGN PATENTS 26,335 12/1953 Finland.

CHARLES E. O'CONNELL, Primary Examiner.

DAVID H. BROWN, Examiner.